3,433,749
GLASS ELECTRODE COMPOSITIONS
Kazuyuki Nishimoto, Ibaraki-shi, and Yoshio Iida, Hirakata-shi, Japan, assignors to Matsushita Electric Industrial Co., Ltd., Osaka, Japan
No Drawing. Filed June 3, 1966, Ser. No. 555,001
Claims priority, application Japan, June 30, 1965, 40/39,870
U.S. Cl. 252—521    4 Claims
Int. Cl. H01b 1/08, 1/00

ABSTRACT OF THE DISCLOSURE

In order to produce electrode glass compositions which have both remarkable low electrical resistance and high electrical potential per unit pH, in addition to other desirable characteristics, it is necessary that the compositions contain both BaO and $U_3O_8$, in special amounts (3 to 15 wt. percent of the latter and 5 to 13 wt. percent of the former).

---

The present invention relates to novel glass compositions and more particularly to novel electrode glass compositions having remarkably low electrical resistance and high electrical potential per unit pH.

Important characteristics of glass electrode compositions are low electrical resistance, high electrical potential per unit pH, high chemical durability, linearity between electrical potential and pH, and ease of fabrication.

In the past, glass electrode compositions have been developed in an effort to reduce electrical resistance. High electrical resistance requires an amplifier provided with a high impedance output when a glass electrode is used for measuring of pH according to a well known method.

Lithium silicate glass reported by Perley (Anal. Chem. 21, 394, 559 (1949)) is known to have high electrical potential but its electrical resistance is still high, and ranges from 10MΩ to 100MΩ.

It is known experimentally that the lower electrical resistance of the glass electrode is apt to result in lower electrical potential and poorer chemical durability. Though it is possible to reduce an apparent electrical resistance of a glass electrode by decreasing the thickness of the glass membrane, a very thin glass membrane is not desirable from the standpoint of reduced mechanical strength.

Therefore, glass electrode compositions having both low electrical resistance and high electrical potential per unit pH are expected to widen the application of glass electrodes and inter alia to simplify amplifier systems. Recent medical technique requires a very small glass electrode to measure pH of the fluid of the gastrointestine by radio telemetry methods.

It is an object of this invention to embody glass electrode compositions which have a low electrical resistance, high electrical potential (over 58 mv./pH), high chemical durability, and a linearity between electrical potential and pH in the raneg of pH 1 to 10.

This object is realized, according to this invention, by dissolving uranium oxide into a conventional glass electrode composition, in an amount of up to 15 wt. percent; this is achieved without devitrification of the glass and, unexpectedly, with marked reduction of the electrical resistance.

The conventional glass electrode compositions consist essentially of silicon dioxide, monovalent metal oxide, cesium oxide, lanthanum oxide, zirconium oxide and divalent metal oxide such as barium oxide. The addition of uranium oxide, according to the invention, always reduces the electrical resistance and sometimes decreases the electrical potential. According to this invention, however, the electrical potential of glass electrode compositions containing uranium oxide is increased by using barium oxide as an ingredient and by controlling the amount thereof. An addition of uranium oxide in amount smaller than 3 wt. percent does not show any remarkable decrease in electrical resistance of the resultant compositions. Table 1 below sets forth the ingredients, and their proportions, of glass electrode compositions which have high electrical potential and low electrical resistance. The proportion ranges are in terms of weight percentages, as indicated.

TABLE 1

| Ingredients: | Proportions, weight percentages |
|---|---|
| Silica, $SiO_2$ | 30–50 |
| Mononvalent metal oxide, $R_2O$ | 15–22 |
| Cesium oxide, $Cs_2O$ | 5–10 |
| Barium oxide, BaO | 5–13 |
| Lanthanum oxide, $La_2O_3$ | 5–12 |
| Zirconium oxide, $ZrO_2$ | 3–16 |
| Pentavalent metal oxide, $R_2O_5$ | 3–12 |
| Boron oxide, $B_2O_3$ | 0–3 |
| Uranium oxide, $U_3O_8$ | 3–15 |

In Table 1, the monovalent metal oxide is lithium oxide, sodium oxide or potassium oxide, and the pentavalent metal oxide is vanadium oxide or niobium oxide.

The essence of the present invention therefore is the realization of the indicated desired electrical properties by including, in otherwise conventional glass electrode compositions, both uranium oxide and barium oxide, the former in an amount of 3 to 15% by weight and the latter in an amount of 5 to 13% by weight.

The following examples of presently preferred embodiments of the invention are given by way of illustration and should not be construed as limitative.

The glass electrode compositions of the present invention are produced by weighing, dry blending and then melting in a platinum crucible a suitable batch formulation containing or generating the reagents listed in Table 1 and in the following examples, in the amounts given. The various reagents such as the oxides can be added to the batch compositions stoichiometrically in the form of their carbonates or nitrates, etc. for purposes of cost, stability and convenience. The blending material is melted at about 1200° C. for 2 hours, heated additionally at 1300° C. for 1 hour, and then cooled rapidly to obtain a glass block. The glass block, crushed into particles of desired size, is melted in a platinum crucible at about 1150° C.

The glass tubing of a glass electrode holder is made of lead silicate glass and has almost the same coefficient of thermal expansion as that of the glass electrode compositions. The glass electrode is formed in a small size for the purpose of measuring the gastrointestinal pH. The tubing is e.g. of 2.5 to 3.0 mm. outside diameter, 2.1 to 2.6 mm. inside diameter and 4.0 mm. in length. A small amount of the molten glass is picked up by the glass holder and is blowed into a small bubble of e.g. 3.0 mm. in outside diameter and 2.8 mm. in inside diameter.

The electrical properties of the glass electrode compositions of the present invention were compared with the corresponding properties of typical conventional compositions containing no uranium oxide. The electrical resistance of glass electrodes of a constant size is measured at 25° C. by using platinum wires immersed in 0.1 normal KCl aqueous solution under an electric field of 2 v. (DC). The electrical potential is measured at 25° C. by forming a cell consisting of the glass electrode and of a standard electrode which are immersed in a buffer solution containing 0.05 mol/liter of potassium biphthalate and 0.01 mol/liter of sodium borate in 1000 cc. of water. The results are shown in Table 2.

TABLE 2.—CALCULATED COMPOSITION (WEIGHT PERCENTAGES) AND ELECTRICAL PROPERTIES

| Ingredients and electric properties | Examples | | | | | | | |
|---|---|---|---|---|---|---|---|---|
| | 1 | 2 | 3 | 4 | 5 | 6 | 7 | 8 |
| $SiO_2$ | 41.70 | 40.70 | 41.70 | 41.10 | 44.00 | 40.00 | 46.00 | 45.00 |
| $Li_2O$ | 16.40 | 16.40 | 17.40 | 16.40 | 18.00 | 17.00 | 15.40 | 16.40 |
| $Cs_2O$ | 7.50 | 7.50 | 7.50 | 8.00 | 5.00 | 5.40 | 6.80 | 7.50 |
| $B_2O_3$ | 1.40 | | 1.00 | | | | | |
| $La_2O_3$ | 5.00 | 5.00 | 6.00 | 5.00 | 6.50 | 6.00 | 6.00 | 5.00 |
| $BaO$ | 8.00 | 9.00 | 8.00 | 9.50 | 8.50 | 9.50 | 10.45 | 9.40 |
| $Nb_2O_5$ | 3.00 | 5.40 | 5.40 | 4.00 | 4.50 | 4.00 | 4.85 | 3.85 |
| $ZrO_2$ | 7.00 | 6.00 | 6.00 | 10.00 | 6.50 | 8.50 | 10.50 | 8.85 |
| $Al_2O_3$ | | | 1.00 | | | | | 4.00 |
| $U_3O_8$ | 10.00 | 10.00 | 6.00 | 6.00 | 7.00 | 9.60 | | |
| Electrical resistance (MΩ) at 25° C | 5 | 5 | 7 | 3 | 2 | 4 | 25 | 30 |
| Electrical potential (mv./pH) at 25° C | 58.5 | 58.9 | 59.0 | 59.1 | 58.4 | 58.8 | 58.1 | 58.3 |

It is found that the addition of uranium oxide into a conventional glass electrode composition thus unexpectedly results in an electrical resistance markedly lower than that of the conventional composition. The electrical potential of the present compositions is essentially the same as that calculated theoretically, 59.15 mv./pH at 25° C. There is no difference between the chemical durability of the present compositions containing uranium oxide and that of compositions containing no uranium oxide. The compositions of this invention show a good linearity between electrical potential and pH in the range of pH 1 to 10.

The present invention is not limited to the specific materials listed in Table 2, it being understood that equivalent materials may in some cases be substituted. For instance, in place of lithium oxide, there may be used another monovalent metal oxide such as potassium oxide or sodium oxide. However, a combination of two or more monovalent metal oxides such as sodium oxide and lithium oxide should be avoided, because the combination makes the electrical resistance higher than that of compositions containing only one kind of said monovalent oxides.

Variations and modifications may be made within the scope of the claims and portions of improvements may be used without others.

We claim:

1. Glass electrode composition consisting essentially of the following ingredients:

| | Weight percent |
|---|---|
| Silica | 30–50 |
| Monovalent metal oxide selected from the group consisting of lithium oxide, potassium oxide and sodium oxide | 15–22 |
| Cesium oxide | 4–10 |
| Barium oxide | 5–13 |
| Lanthanum oxide | 5–12 |
| Zirconium oxide | 3–16 |
| Pentavalent metal oxide selected from the group consisting of niobium oxide and vanadium oxide | 2–12 |
| Boron oxide | 0–3 |
| Uranium oxide | 3–15 |

2. Glass electrode composition according to claim 1, consisting essentially of the following ingredients:

| | Weight percent |
|---|---|
| Silica | 35–45 |
| Monovalent metal oxide selected from the group consisting of lithium oxide, potassium oxide and sodium oxide | 15–18 |
| Cesium oxide | 5–8 |
| Barium oxide | 8–10 |
| Lanthanum oxide | 5–7 |
| Zirconium oxide | 6–10 |
| Pentavalent metal oxide selected from the group consisting of niobium oxide and vanadium oxide | 3–6 |
| Boron oxide | 0–2 |
| Uranium oxide | 5–10 |

3. Glass electrode composition according to claim 2, wherein the monovalent metal oxide is lithium oxide and the pentavalent metal oxide is niobium oxide.

4. Glass electrode composition according to claim 1, consisting essentially of the following ingredients:

| | Weight percent |
|---|---|
| Silica | 41.1 |
| Lithium oxide | 16.4 |
| Cesium oxide | 8.0 |
| Barium oxide | 9.5 |
| Lanthanum oxide | 5.0 |
| Zirconium oxide | 10.0 |
| Niobium oxide | 4.0 |
| Uranium oxide | 6.0 |

References Cited

UNITED STATES PATENTS 3,372,104  5/1964  Ross et al. _____ 204—195

OTHER REFERENCES

Chemical Abstracts, vol. 49, col. 5796d (1955).

LEON D. ROSDOL, *Primary Examiner.*

J. D. WELSH, *Assistant Examiner.*

U.S. Cl. X.R.

106—47, 52; 204—195, 291; 252—500, 518